Sept. 27, 1960    F. W. BAUERSCHMIDT    2,954,094
GAS-LIQUID RATIO CONTROL MECHANISM
Filed Jan. 7, 1953
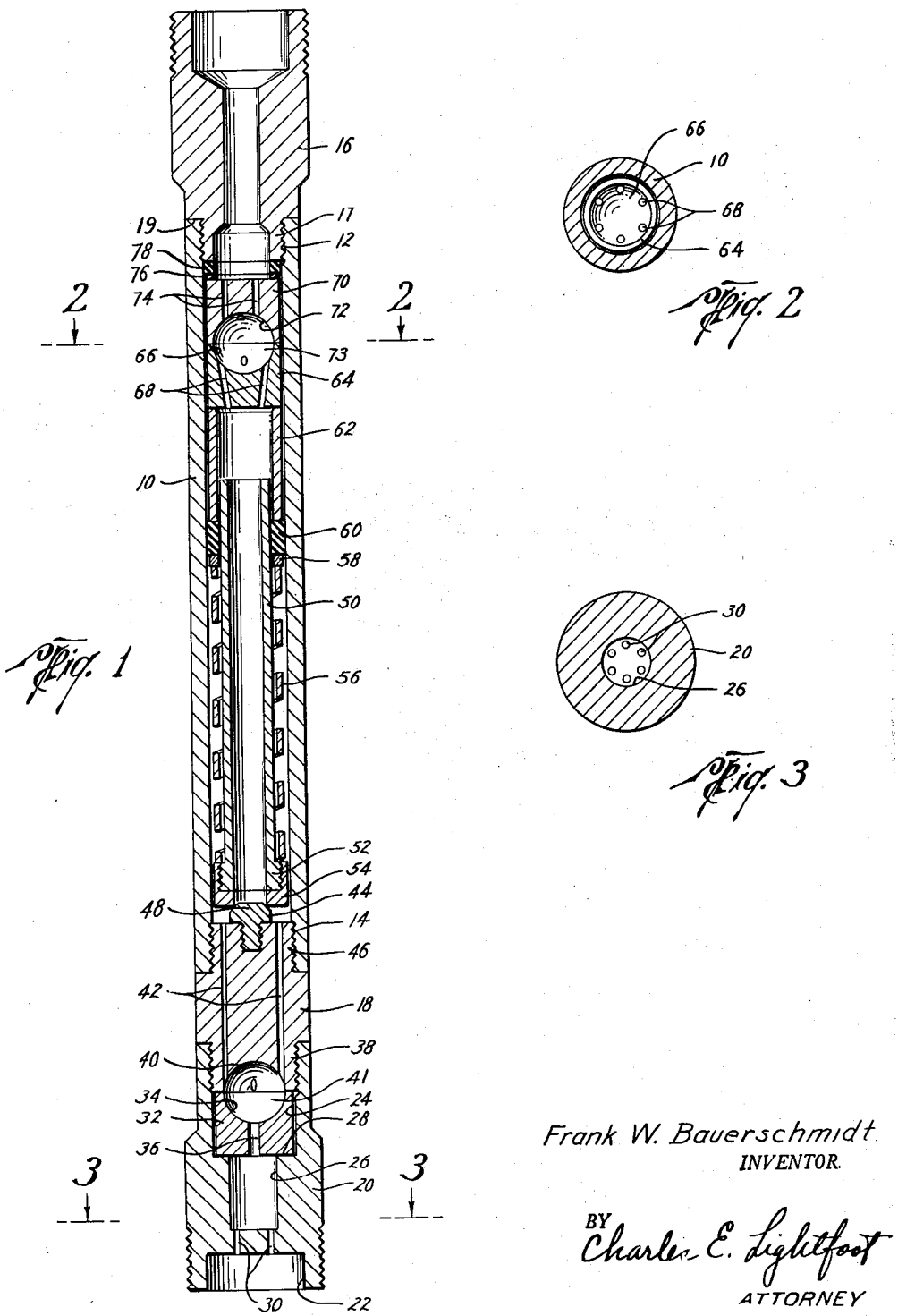
Frank W. Bauerschmidt
INVENTOR.
BY Charles E. Lightfoot
ATTORNEY United States Patent Office 2,954,094
Patented Sept. 27, 1960

2,954,094
GAS-LIQUID RATIO CONTROL MECHANISM
Frank W. Bauerschmidt, 1806 5th St., Galena Park, Tex.
Filed Jan. 7, 1953, Ser. No. 330,106
2 Claims. (Cl. 183—2.7)

This invention relates to gas-liquid ratio control mechanism, and more particularly to apparatus for reducing and controlling the ratio of gas to oil in the operation of oil wells.

While the invention is especially useful in connection with the operation of oil wells, wherein the ratio of gas to oil produced is high, it will be understood that the invention may be applied with equally satisfactory results to other types of equipment in which gas and liquid are coexistent and in which it may be desirable to reduce and control the ratio of gas to liquid.

An important object of the invention is to provide gas-liquid ratio control mechanism, which is adapted to be connected into a flow line through which a mixture of gas and liquid is flowing under pressure, and which is constructed to retard the flow through the line whereby the ratio of gas to liquid may be reduced and controlled.

Another object of the invention is the provision of gas-liquid ratio control mechanism wherein a mixture of gas and liquid is passed first through a small opening and then introduced into a larger opening whereby the mixture is compressed and expanded and agitated, resulting in a separation of the gas and liquid whereby the ratio of gas to liquid in the mixture is substantially reduced.

A further object of the invention is to provide gas-liquid ratio control mechanism having means for causing retardation of the flow of a gas and liquid mixture under pressure and means whereby the retardation is subsequently relieved and re-applied, resulting in a substantial reduction in the ratio of gas to liquid in the mixture.

Another object of the invention is the provision of gas-liquid ratio control mechanism wherein means is embodied for retarding the flow of a gas and liquid mixture, and for relieving the retardation, whereby the ratio of gas to liquid in the mixture is substantially reduced, and also wherein means is embodied for causing an excess of liquid to be accumulated which is then propelled through the mechanism by the flow of gas and liquid mixture therethrough.

A further object of the invention is to provide gas-liquid ratio control mechanism having means for adjusting the same in accordance with the pressure of the mixture of gas and liquid in which the gas to liquid ratio is to be reduced, whereby the amount of reduction of the ratio may be accurately controlled.

A still further object of the invention is to provide gas-liquid ratio control mechanism which is of simple design and rugged construction, having few working parts likely to become worn or out of adjustment and which is capable of withstanding the hard usage to which such mechanism is often subjected.

The above and other important objects and advantages of the invention will best be understood from the following detailed description of a preferred form of the same, when considered in conjunction with the annexed drawings wherein—

Figure 1 is a longitudinal, central, cross-sectional view of the invention;

Figure 2 is a cross-sectional view, taken along the line 2—2 of Figure 1, looking in the direction indicated by the arrows; and Figure 3 is a cross-sectional view taken along the line 3—3 of Figure 1, looking in the direction indicated by the arrows.

Referring now to the drawings in greater detail, the invention comprises a main body or tubular barrel 10, which is internally threaded at its opposite ends, as indicated at 12 and 14. The end 12 of the barrel is connected to a tubular connector member or combination collar 16 having a reduced, externally threaded, end portion 17 which forms an external annular shoulder 19 positioned to abut the adjacent end of the barrel. The end 14 of the barrel is similarly connected to a two part connector member made up of threadably connected tubular sections 18 and 20. The connector 16 and the section 20 provide means by which the device may be conveniently connected into a flow line through which a mixture of gas and liquid is adapted to flow such as a flow line from an oil well, the tubular section or combination collar 20 being at the receiving end of the mechanism, while the member 16 is at the discharge end thereof.

The member 20 has a counterbore 22 in its outer end portion and a counterbore 24 in its inner end portion, and inwardly of the counterbore 24 there is a counterbore 26 of somewhat smaller diameter providing an internal annular shoulder 28. A plurality of small bores 30, six such bores being shown in the present illustration, are provided in the member 20, forming restricted passageways from the bottom of the counterbore 22 to the bottom of the counterbore 26.

Within the counterbore 24 and seated on the internal annular shoulder 28 of the member 20, there is a cylindrical plug or atomizer block 32, having a hemispherical cavity 34 in its inner end and provided with a central bore 36 forming a restricted passageway from the counterbore 26 into the bottom of the cavity 34. The plug or atomizer block 32 is retained in seated engagement with the end portion 38 of the member 18, which is threaded into the adjacent end of the member 20. Member 18 also has a hemispherical cavity 40 in its end portion 38, which opens into the cavity 34 to form therewith a spherical chamber 41. The member 18 is also provided with a number of small bores 42, six such bores being provided in the present illustration, forming restricted passageways leading from the cavity 40 to the opposite end of the member.

The passageways 42 open into the chamber 41 at points which are spaced radially outwardly from the point at which the bore 36 enters the chamber, so that fluid under pressure entering the chamber through the bore 36 must change direction before flowing out through the passageways 42, thus causing the fluid to be agitated in the chamber during operation of the device.

A valve 44 is attached to the end portion 46 of the member 18, in any suitable manner, this valve being provided with an annular, tapered, valve-seat engaging surface 48 disposed in substantially concentric relation to the bore of the barrel 10 and within the lower end of the same.

Within the barrel 10, and movable longitudinally, therein, there is a tubular stem 50, having an externally enlarged end portion 52 upon which is threaded an annular valve seat member 54 which is engageable with the valve 44 to close the stem, and a coil spring 56 or other suitable resilient means surrounds the stem and bears at one end upon the valve seat member 54. The spring 56 bears at its opposite end upon suitable packing means surrounding the stem and forming a seal between the stem and the inside of the barrel so that the spring urges the stem in a direction to close the valve. In the present illustration this packing means takes the form of a packing washer 58, which engages the end of the spring and bears upon an annular, resilient packing element 60. The packing element bears upon one end of a tubular spacer 62, into which the tubular stem 50 is slidably extended and upon whose opposite end a cylindrical plug or atomizer block 64 is seated, this block having a hemispherical cavity 66 at one end and being provided with a number of small bores 68, six such bores being shown in the present illustration, which form restricted passageways leading divergently from the interior of the spacer 62 into the cavity 66. Another similar plug or atomizer block 70 is also positioned in the barrel 10, seated on the plug 64 and having a hemispherical cavity 72 which opens into the cavity 66 to form therewith a spherical chamber 73. The plug 70 has a number of small bores 74, six such bores being provided in the present illustration, which form restricted passageways leading from the cavity 72 to the opposite end of the plug.

The passageways 68 may enter the chamber 73 at points positioned to cause the fluid to enter the chamber along paths which are substantially tangential to the inner surface of the chamber, while the passageways 74 open into the chamber at points spaced radially inwardly of the points at which the passageways 73 enter the chamber. By this construction fluid entering the chamber 73 is caused to swirl about the chamber and must change direction before flowing out through the passageways 74, thus agitating the fluid.

Suitable spacers, such as the annular members 76 and 78 are inserted in the barrel in engagement with the plug 70 and with which the connector member 16 is engageable.

It will be apparent that the spacers 76 and 78 may be formed of hard material and by varying the number or thickness of the same the compressive force exerted on the spring 56 may be suitably varied to adjust the force necessary to open the valve.

In making use of the invention the device is connected into a flow line such as that leading from a producing oil well from which a mixture of gas and oil is flowing in which the ratio of gas to oil may be many thousand to one. The mixture of gas and oil enters the receiving end of the device through the counterbore 22 from whence it passes through the restricted passageways 30 into the counterbore 26 and then through the restricted bore 36 into the chamber 41. In passing through the passageways 30 the mixture is retarded and then expands into the counterbore 26, and in flowing through the restricted bore 36 the mixture is further retarded and again expands into the chamber 41, wherein it impinges against the inner surface of the chamber and is agitated therein before passing out through the restricted passageways 42 which enter the chamber at points spaced radially outwardly of the point at which the passageway 36 enters the chamber. The successive retarding, expansion and agitation or atomizing action thus brought about may cause a substantial reduction in the ratio of gas to liquid in the mixture so that after the mixture has been flowing through the device for some time the chamber 41 may or may not acquire and retain a quantity of liquid which may accumulate to the extent that the same passes out of the chamber through the passageways 42 into the barrel 10. The reduction in the ratio of gas to oil and the increase in the gravity of the mixture may be effective to cause the valve seat member to be moved away from the valve to permit a greater flow of the mixture into the stem 50. The mixture may then pass on through the restricted passageways 68 into the chamber 73, being further retarded in its passage through the passageways and expanded into the chamber 73, wherein it is further agitated before passing out through the passageways 74 which open into the chamber at points spaced radially inwardly from the points at which the passageways 68 enter the chamber. The mixture is thus again subjected to retarding, expansion and agitation, or atomizing action, resulting in a further reduction in the ratio of gas to liquid. Upon the accumulation of liquid in the chamber 41 or in the chamber 73, further quantities of the mixture of gas and liquid passing therethrough will be agitated with the liquid which results in additional liquid being taken up by the mixture thus increasing the amount of liquid in the mixture and reducing the ratio of gas to liquid therein, so that the amount of gas which escapes with the liquid is greatly reduced.

The force of the spring 56 tending to close the valve may be readily adjusted by changing the thickness of the washer 76 or adding additional washers, so that the valve may be regulated to a predetermined pressure depending upon the bottom hole pressure of the well or other variable factor.

It will thus be seen that the invention as described above provides gas-liquid ratio control mechanism which is of simple design, which is easily assembled and dissembled for purposes of replacement and repair, and which can be accurately adjusted for different pressure and gas to oil ratio conditions.

The invention has been disclosed herein in connection with a certain specific embodiment of the same, but it will be understood that this is intended by way of illustration only, and that numerous changes can be made in the construction and arrangement of the various parts, without departing from the spirit of the invention or the scope of the appended claims.

Having thus clearly shown and described the invention, what is claimed as new and desired to secure by Letters Patent is:

1. A device of the character described comprising, a body having a chamber therein, said chamber being provided with a concave end portion, said body having a restricted inlet passage leading into said chamber at a point opposite said concave portion, whereby fluid may be admitted to said chamber and agitated therein, said body having a plurality of restricted outlets leading from the concave end of said chamber at points offset from the point of entrance of said inlet passage for the escape of fluid from the chamber, whereby the ratio of gas to liquid in the fluid is decreased, another agitating means spaced from said chamber and in communication therewith, and pressure responsive means for regulating the flow of fluid between said chamber and said agitating means.

2. A device of the character described comprising, a tubular body, spaced barriers in the body, each of said barriers having a spherical chamber therein and restricted inlet and outlet passages in communication with said chamber, the outlet passages in one of said barriers being disposed to receive fluid from the chamber therein along paths substantially tangential to the inner wall of the chamber and the inlet passages in the other of said barriers being disposed to direct fluid into the chamber therein along paths substantially tangential to the inner wall of the chamber, and pressure responsive means located between said barriers for controlling the flow of fluid through the body.

References Cited in the file of this patent

UNITED STATES PATENTS

| | | |
|---|---|---|
| 1,514,200 | Chrisman et al. | Nov. 4, 1924 |
| 1,554,835 | Barrett | Sept. 22, 1925 |
| 1,663,311 | Miles | Mar. 20, 1928 |
| 1,836,843 | Fletcher | Dec. 15, 1931 |
| 1,913,041 | Raymond | June 6, 1933 |
| 2,227,539 | Dorton | Jan. 7, 1941 |
| 2,291,378 | Courtney | July 28, 1942 |
| 2,353,652 | Coonrod | July 18, 1944 |
| 2,560,416 | Courtney | July 10, 1951 |
| 2,565,742 | Sailers | Aug. 28, 1951 |
| 2,609,226 | Young | Sept. 2, 1952 |
| 2,652,000 | Woolsey | Sept. 15, 1953 |